US012730905B2

(12) United States Patent
Johnson et al.

(10) Patent No.: US 12,730,905 B2
(45) Date of Patent: Sep. 8, 2026

(54) CONTEXT-AWARE AUTHORIZATION VERIFICATION FOR API ENDPOINTS USING LARGE LANGUAGE MODELS

(71) Applicant: DryRun Security Co., Austin, TX (US)

(72) Inventors: Kenny Russell Johnson, Gainesville, VA (US); James Wickett, Round Rock, TX (US)

(73) Assignee: DryRun Security Co., Austin, TX (US)

( * ) Notice: Subject to any disclaimer, the term of this patent is extended or adjusted under 35 U.S.C. 154(b) by 0 days.

(21) Appl. No.: 19/538,719

(22) Filed: Feb. 12, 2026

(65) Prior Publication Data

US 2026/0236589 A1 Aug. 13, 2026

Related U.S. Application Data

(60) Provisional application No. 63/757,621, filed on Feb. 12, 2025.

(51) Int. Cl.
*G06F 21/57* (2013.01)
*G06F 11/3604* (2025.01)
(Continued)

(52) U.S. Cl.
CPC ........ *G06F 21/577* (2013.01); *G06F 11/3604* (2013.01); *G06F 40/279* (2020.01); *G06F 40/30* (2020.01); *G06F 21/563* (2013.01)

(58) Field of Classification Search
CPC .. G06F 21/577; G06F 11/3604; G06F 40/279; G06F 40/30; G06F 18/20; G06F 21/563; G06F 2221/033; G06F 21/562
See application file for complete search history.

(56) References Cited

U.S. PATENT DOCUMENTS 10,999,413 B1 * 5/2021 Gino ..................... H04L 67/561
2014/0201195 A1 * 7/2014 Kirazci .................. G06F 16/31 707/722

(Continued)

FOREIGN PATENT DOCUMENTS

CN 119918059 A * 5/2025

OTHER PUBLICATIONS

Sinan Sakaoglu, "KARTAL: Web Application Vulnerability Hunting Using Large Language Models", Master's thesis, obtained online from <https://kth.diva-portal.org/smash/get/diva2:1800421/FULLTEXT01.pdf>, retrieved on Apr. 16, 2026. (Year: 2023).*

(Continued)

*Primary Examiner* — Zhimei Zhu
(74) *Attorney, Agent, or Firm* — Perkins Coie LLP

(57) ABSTRACT

Context-aware authorization verification for Application Programming Interface (API) endpoints using large language models (LLMs) is disclosed herein. A system receives source code including an implementation file and at least one service definition file. The service definition file(s) include metadata and a service interface definition. The system determines that the source code implements an API handler by determining that the implementation file includes a reference to the service interface definition. The metadata is used to determine that the API handler is associated with a public endpoint. An LLM is used to determine that the source code lacks an authorization check by determining absence of a direct call to an authorization function, and determining absence of an indirect authorization check. An alert is generated indicating that the source code implements an API handler associated with a public endpoint and that the source code lacks an authorization check.

20 Claims, 9 Drawing Sheets

(51) Int. Cl.

| | |
|---|---|
| ***G06F 40/279*** | (2020.01) |
| ***G06F 40/30*** | (2020.01) |
| *G06F 21/56* | (2013.01) |

(56) References Cited

U.S. PATENT DOCUMENTS

| | | | | |
|---|---|---|---|---|
| 2018/0121320 | A1* | 5/2018 | Dolby | G06F 11/3604 |
| 2018/0351989 | A1* | 12/2018 | Nazir | H04L 41/0803 |
| 2020/0301761 | A1* | 9/2020 | Bharti | G06F 9/54 |
| 2021/0037038 | A1* | 2/2021 | Alsharif | G06F 17/16 |
| 2025/0321729 | A1* | 10/2025 | Avadhanam | G06F 8/658 |
| 2025/0322078 | A1* | 10/2025 | Sasson | G06F 21/577 |
| 2026/0030362 | A1* | 1/2026 | Sasson | G06F 21/577 |
| 2026/0087142 | A1* | 3/2026 | Borcherdt, III | G06F 21/577 |

OTHER PUBLICATIONS

Jie Lu, et al. Detecting Missing-Permission-Check Vulnerabilities in Distributed Cloud Systems. In Proceedings of the 2022 ACM SIGSAC Conference on Computer and Communications Security (CCS '22). Association for Computing Machinery, New York, NY, USA, 2145-2158. (Year: 2022).*

* cited by examiner

```
diff -git a/README.md b/README.md
index 888c500..f0093e3 100644
--- a/README.md
+++ b/README.md
@@ -1,2 +1,3 @@
# Web Project
-This is the group website.
+This is the company homepage.
+
diff --git a/main.py b/main.py
index 777a123..e119a0b 100644
--- a/main.py
+++ b/main.py
@@ -10,3 +10,7 @@ def greet(name):
print (f"Hello, {name}!")

+def new_feature():
+ print("This is a new feature!")
+
+
if_name_ == "_main_":
greet("World")
```

CONTEXT-AWARE AUTHORIZATION VERIFICATION FOR API ENDPOINTS USING LARGE LANGUAGE MODELS

CROSS-REFERENCE TO RELATION APPLICATION

This application claims the benefit of U.S. Provisional Patent Application No. 63/757,621, filed Feb. 12, 2025, the contents of which are incorporated herein by reference.

BACKGROUND

Software development practices can involve frequent code changes and rapid deployment cycles, which can introduce security vulnerabilities that are difficult for security teams to identify and address in a timely manner. Static application security testing tools have been developed to analyze source code for potential security flaws. These tools typically rely on pattern matching, syntactic rules, or parsing code into abstract syntax trees to detect issues such as SQL injection, command injection, or usage of unsafe libraries. While such approaches can be effective for identifying known vulnerability patterns that conform to specific, predefined shapes, they face challenges when analyzing more nuanced security concerns. In particular, authorization checks and business logic flaws often vary significantly across different projects and organizations, making it difficult to encode all relevant conditions into static rule sets or formal models.

Authorization verification in application programming interfaces (APIs) presents particular challenges for code analysis. Different organizations implement authorization in unique ways, often using custom function names, frameworks, or multi-step verification processes that do not conform to recognizable patterns. Authorization logic may be composed of multiple checks, deeply nested conditions, or indirect function calls that eventually lead to permission verification. Furthermore, API endpoint definitions may be stored in separate interface definition language files or service definition files that are distinct from the application code itself, requiring analysis across multiple file types and locations to determine whether an endpoint should be publicly accessible or restricted. These factors can make it difficult for pattern-based analysis approaches to accurately determine whether appropriate authorization checks are present for a given API endpoint.

BRIEF DESCRIPTION OF THE DRAWINGS

Detailed descriptions of implementations of the present invention will be described and explained through the use of the accompanying drawings.

Figure 1:
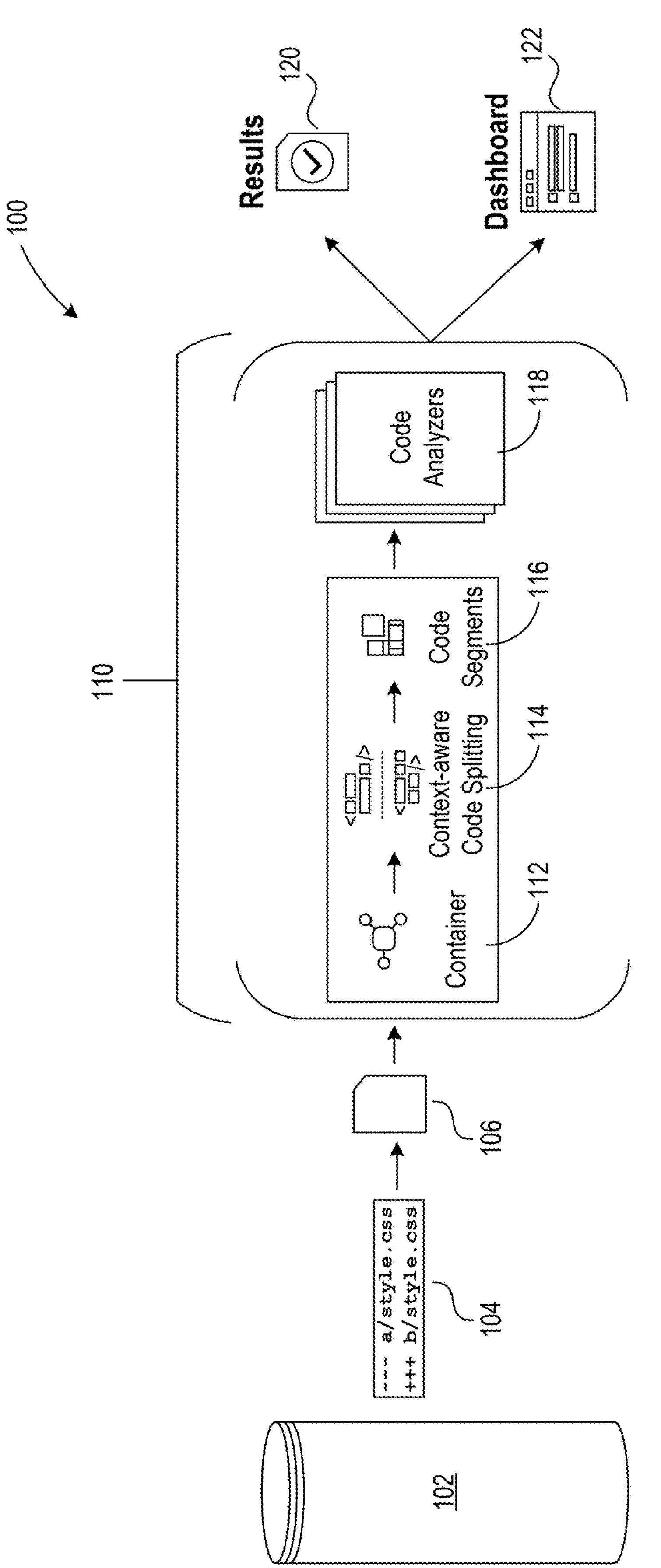
FIG. 1 is a drawing illustrating the components of a security analyzer platform in accordance with one or more embodiments of the disclosed technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Code analysis systems typically use pattern-based approaches to identify security vulnerabilities in software applications. These systems parse source code into abstract syntax trees and apply lexical analysis, pattern matching, or static parsing of code paths to detect flaws that conform to specific, predefined shapes. While such approaches can be used for identifying exact vulnerability patterns such as SQL injection, command injection, or usage of unsafe libraries when those patterns are known ahead of time, they face challenges when analyzing authorization logic and business rules. Authorization checks can vary substantially from project to project and often involve domain-specific logic that is difficult to encode into static rule sets. Even more advanced static analysis techniques, such as symbolic execution and abstract interpretation, rely on formal models or constraints that must be defined in advance, making it challenging to capture all relevant conditions for authorization verification across diverse codebases.

Existing code analysis tools can struggle with authorization verification for several reasons. First, these tools can have difficulty grasping the contextual logic around when authorization calls should occur or whether they should exist at all. Second, different organizations and projects implement authorization in unique ways, often using custom function names, frameworks, or multi-step verification processes that do not match recognizable patterns. Third, authorization logic can be composed of multiple checks or deeply nested conditions that do not conform to simple patterns. Additionally, many architectures store application programming interface (API) endpoint definitions in separate interface definition language files or service definition files that are distinct from the application code itself. These files can specify service endpoints, data types, and access modifiers that determine whether an endpoint should be publicly accessible or restricted.

Many code analysis tools focus primarily on parsing and analyzing application code rather than external service definition files, resulting in limited visibility into metadata or annotations that indicate an endpoint's intended accessibility.

The pattern-based nature of many existing code analysis approaches can result in both false negatives and maintenance challenges. If a pattern does not precisely match predefined rules, the tool can overlook potential vulnerabilities entirely, leaving dangerous security flaws undiscovered. Furthermore, these approaches can require multiple carefully constructed rules that break when coding conventions change, making maintenance, refactoring, and updates difficult. The need to define all relevant patterns and conditions in advance means that these tools lack the ability to dynamically discover new flaws or adapt to new domain-specific information without manual reconfiguration.

The present disclosure describes systems, methods, and computer-readable media for context-aware authorization verification of API endpoints using large language models (LLMs). In various implementations, a system receives source code from a source code repository or a build pipeline, where the source code includes an implementation file and at least one service definition file containing metadata and a service interface definition. The system determines that the source code implements an API handler by determining that the implementation file includes a reference to the service interface definition, which can involve analyzing a file path associated with the implementation file to determine that the implementation file is located in an API directory or determining that the implementation file includes an import statement referencing the service interface definition. The system determines, based on the metadata, that the API handler is associated with a public endpoint. Using an LLM, the system determines that the source code lacks an authorization check by performing pattern recognition on the source code to determine absence of a direct call to an authorization function and performing semantic analysis on the source code to determine absence of an indirect authorization check. The semantic analysis can include analyzing the source code for markers including a user identifier or a context parameter and can include analyzing gating conditions present in the source code. In response to determining that the API handler is associated with a public endpoint and that the source code lacks an authorization check, the system transmits an alert to a computer system indicating that the source code implements an API handler associated with a public endpoint and that the source code lacks an authorization check.

The disclosed technology addresses the challenges faced by code analysis systems that rely on pattern-based approaches. By leveraging LLMs that can apply broader contextual reasoning to patterns discovered in source code, the disclosed technology can dynamically learn how code is structured, where to look to find answers, and how to reason about authorization approaches used inside of an application. Unlike existing approaches that struggle with contextual ambiguity, custom authorization logic, and complex or dynamic flow, the disclosed technology uses semantic understanding rather than rigid syntax matching to facilitate code comprehension. The system can recognize both known authorization function calls and custom logic, including indirect authorization checks such as session token verification and role verification, even when implemented using custom function names or frameworks that do not conform to recognizable patterns. The disclosed technology can incorporate external service definition files, such as interface definition language (IDL) files or remote procedure call (RPC) framework definition files, to determine whether an endpoint is publicly accessible or restricted, addressing the limitation of code analysis tools that focus primarily on parsing application code rather than external service definition files. Additionally, the disclosed technology can employ agentic validation of a codebase, dispatching one or more agents to autonomously validate source code and traverse the wider codebase to locate relevant files and validate authorization logic, enabling scalable analysis of large codebases that can quickly overwhelm human reviewers and rule-based approaches.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Analyzer Framework

FIG. 1 is a drawing illustrating an example architecture of an analyzer platform 100 in accordance with one or more embodiments of the present technology. In some embodiments, the analyzer platform 100 first receives a change request 106, requested by one or more users of a codebase 102, that includes a proposed change 104 to codebase 102. Codebase 102 includes a collection of directories and files, where some files include text corresponding to one or more programming languages.

In some implementations, the codebase 102 is associated with metadata, including a name, a list of users, and a history of changes made by specific users. In some implementations, the codebase is a GitHub repository, with directories for source code, documentation, tests, and configuration files.

The proposed change 104 can include one or more changes made to one or more files in the codebase 102. In some cases, all code edits in the proposed changes are located in a single file. In some cases, the proposed change 104 includes edits to multiple files in the codebase 102. In some implementations, the proposed change 104 can be represented as a difference against the current codebase 102, such as being represented in the git diff format, which indicates changes to one or more files. In one example, the codebase 102 is a GitHub repository, and the change request 106 is a pull request, which contains the proposed change 104 to the codebase 102 and represents a proposal to merge a set of changes from one branch or version of code into another.

Figure 2:
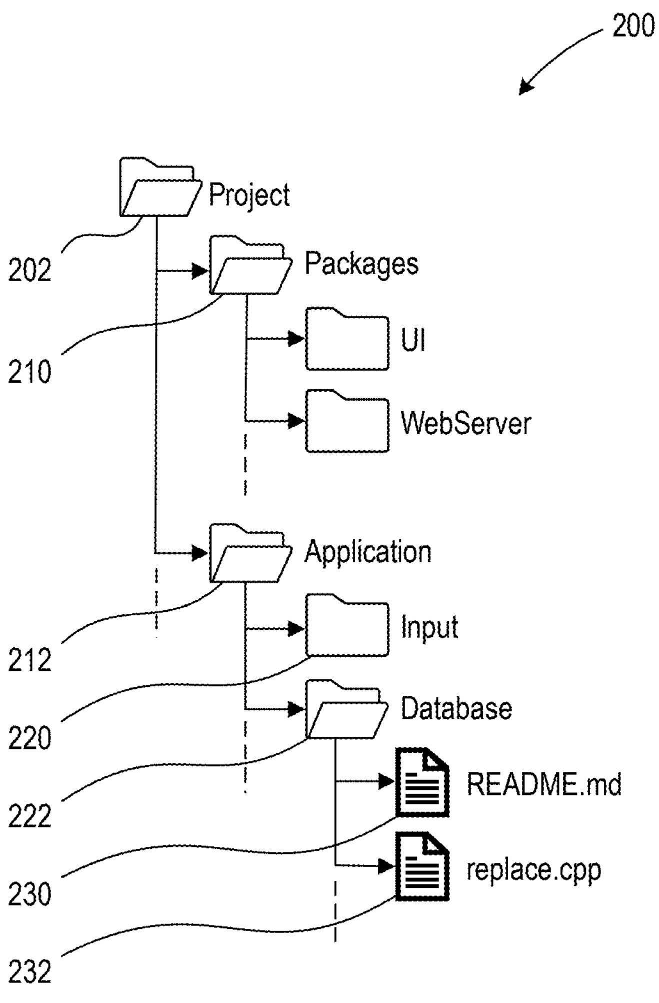
FIG. 2 is a drawing illustrating a codebase structure.

FIG. 2 is a drawing illustrating an example codebase 200 in accordance with one or more embodiments of the present technology. The codebase 200 includes a project directory 202 that serves as the main container or root directory for the project. Within the project directory 202, there can be directories 210, 212 and subdirectories 220, 222. Within the directories/subdirectories, there can be files 230, 232. Any directory in the codebase can contain subdirectories and/or files. Files can be of any format and contain any type of data. For example, file 230 can be a readme file that does not contain text corresponding to executable instructions. File 232 can be a code file, such as a C++ file, which contains text corresponding to executable instructions. The text files can include code written in one or more programming languages. Such files can contain a mixture of text that does and does not correspond to executable instructions. For example, a file containing code can also contain code comments or non-executable code, such as an unused function definition, which does not correspond to executable instructions. In some implementations, the directories and files can contain metadata such as a date of creation, a date of previous modification, an owner name, and/or the name of the last user to modify the contents of the directory or file.

Figure 3:
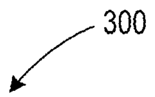
FIG. 3 is a drawing illustrating a format for a proposed change to a codebase.

FIG. 3 is a drawing illustrating an example git diff file showing the code changes. The git diff format 300 for proposed change uses a notation to indicate additions, deletions, and the location of changes within files. This allows changes to the codebase 102 to be represented in a text file. The proposed change 104 can also include text that does not change, such as text above or below a portion of changed text and can include all text from a changed file. Furthermore, the proposed change 104 can include metadata about the changes, including information about a user who requested the change request 106, information about users who contributed to the proposed change 104, and comments included with the change request 106. The proposed change 104 can also contain the text of other files in the codebase in order to provide context to the code change, such as including code dependencies.

Upon receiving the proposed change 104, the analyzer platform 100 processes the proposed change using a code analyzer framework 110. The code analyzer framework 110 represents an approach to processing the data and metadata of a change request 106 for processing by one or more code analyzers 118. The code analyzer framework 110 can be implemented inside of one or more containers 112 for troubleshooting (e.g., ephemeral containers in Kubernetes). A container 112 is an isolated software environment tailored to the execution of code pertaining to the code analyzer framework 110.

Upon receiving the proposed change 104, the code analyzer framework 110 determines a code context 114 for the proposed change 104 based on the codebase 102. As explained above, the code context represents architectural and/or structural information of the files, project-specific patterns, and/or relationships between different parts of the codebase 102. In some cases, known security vulnerabilities can be applicable to one or more specific code contexts. Information that can be used to determine the code context includes file data, file metadata, file paths, and/or user data. Examples of information in a code context can include a file type, programming language, dependencies used (e.g., frameworks, modules, libraries), environment (e.g., frontend, backend), and details of the users creating or requesting the proposed changes (e.g., past behavior, edit frequency, security credentials). The context of the codebase 102 can include information pertaining to all files of the codebase 102 or can include information pertaining to only a portion of the codebase 102. The code context 114 for the proposed change 104 includes aspects of the context of the codebase 102 that pertain to the proposed change 104.

Once a code context 114 has been determined for a proposed change 104, the code context 114 is used to split the proposed change 104 into code segments 116. This can be performed by the code analyzer framework 110 or by one or more code analyzers 118. A code analyzer 118 is a software program designed to process the proposed change 104 to a codebase 102 and the code context 114 of the proposed change 104 to determine if a security vulnerability exists in the proposed change 104. Each code analyzer 118 can be associated with a corresponding aspect of security concerns, including but not limited to: SQL injection, buffer overflow, cross-site scripting, and authentication validation. In some implementations, a code analyzer framework 110 and/or one or more code analyzers 118 process the proposed change 104 and the code context 114 to generate code segments 116. In some implementations, each code analyzer 118 generates code segments 116 corresponding to an aspect of security concerns associated with the code analyzer 118. The one or more code analyzers 118 analyze their corresponding code segments 116 in parallel with other code analyzers 118 to detect potential security vulnerabilities in the proposed change 104. In some implementations, a plurality of code analyzers 118 associated with the same code analyzer framework 110 execute in parallel.

Figure 4:
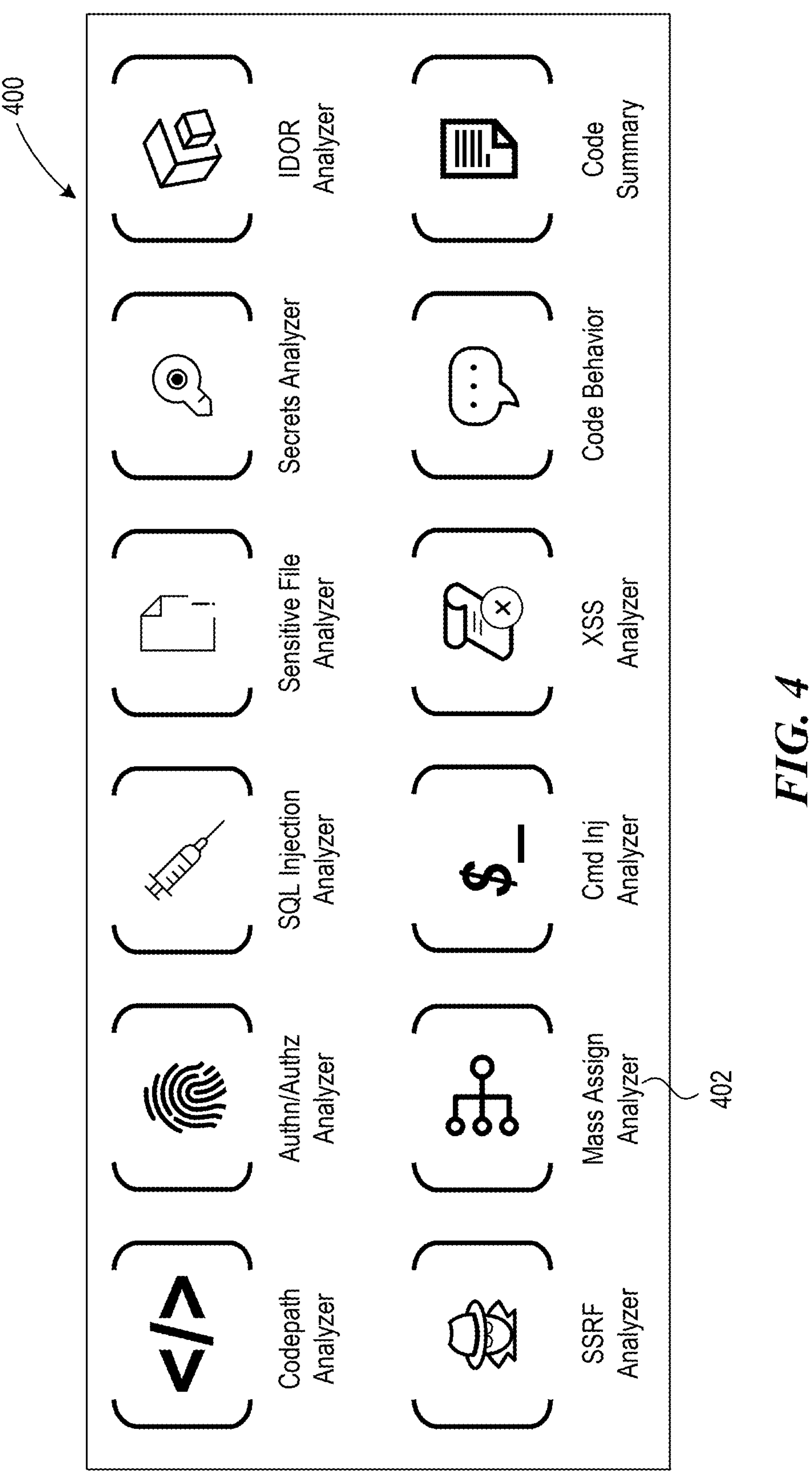
FIG. 4 is a drawing illustrating example code analyzers and corresponding security aspects in accordance with some embodiments of the disclosed technology.

FIG. 4 is a drawing illustrating a list 400 of example code analyzers 402 under a code analyzer framework. The example code analyzers 402 include analyzers for code paths, authentication/authorization, SQL injection, sensitive files, GitHub secrets, insecure direct object references (IDOR), server-side request forgery (SSRF), mass assignment, command injection, cross-site scripting (XSS), code behavior, and code summarization.

Figure 8:
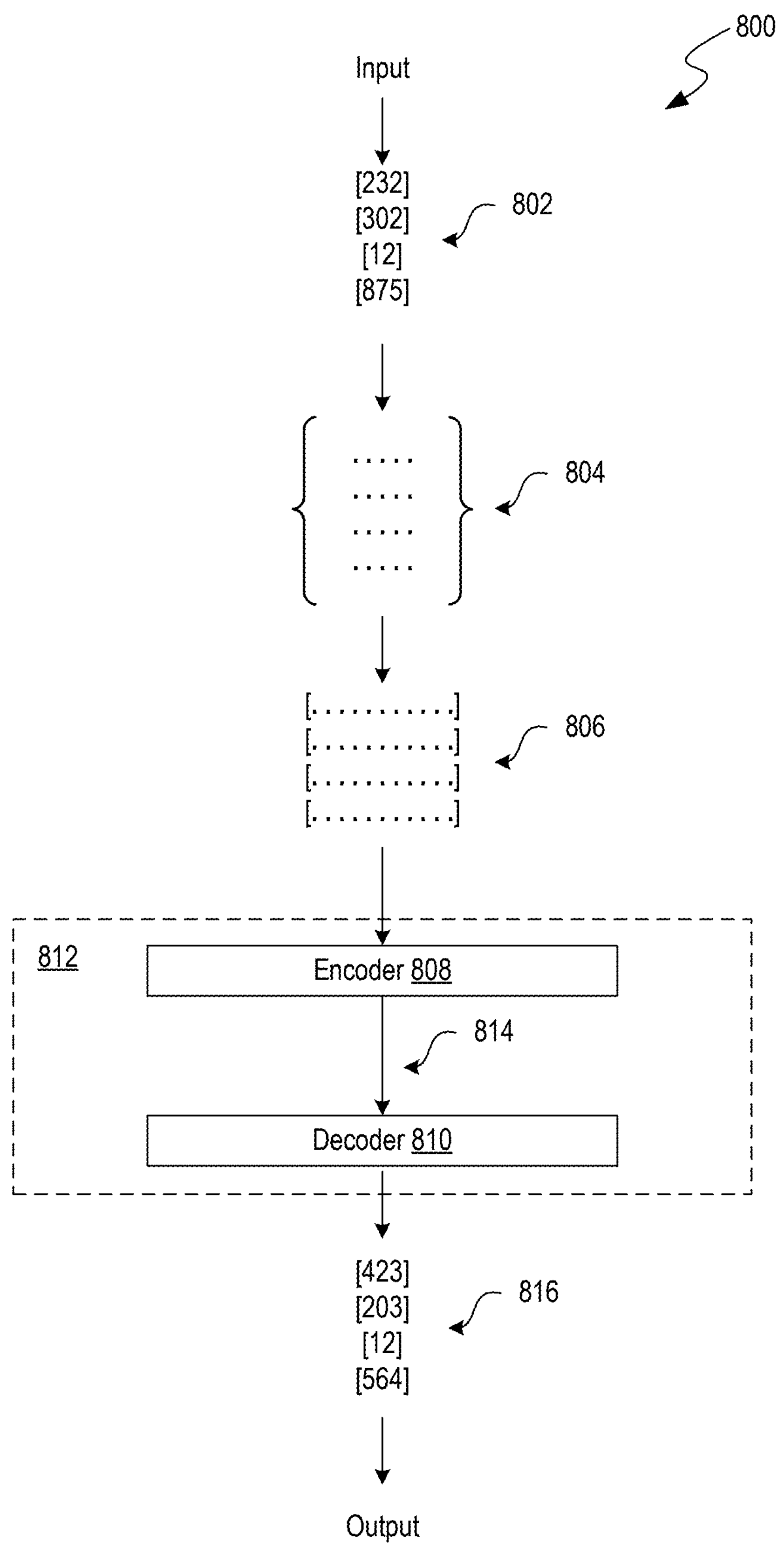
FIG. 8 is a block diagram that illustrates an example transformer in accordance with various embodiments of the present technology.

In some implementations, artificial intelligence (AI) models are used. Examples of AI models include LLMs, such as schematically depicted in FIG. 8. In some implementations, one or more code analyzers 118 use one or more LLMs to process code context 114, code segments 116, and one or more prompts in order to detect a security vulnerability. An LLM can be used to understand the context and semantics of code changes more effectively, finding more vulnerabilities and avoiding more false positives than other pattern matching techniques, such as regular expression (e.g., RegEx) matching. These models can additionally generate natural language explanations of detected vulnerabilities and/or provide suggestions for code improvements. In some embodiments, LLMs can be used to process natural language security questions, allowing for more flexible and more easily understood security policies. The integration of AI models enables a system to quickly adapt to new security threats and coding practices over time, without the need to manually enter new patterns corresponding to these new threats, improving the accuracy and efficiency of the security analysis process.

The code analyzers 118 produce one or more security analysis reports 120. A security analysis report 120 can include information such as the name of one or more code analyzer(s) 118 used to produce the report, the corresponding security aspect(s) of the one or more analyzer(s), detected security vulnerabilities, risk level or urgency level associated with each detected security vulnerability, and/or a time taken for an analyzer to detect a security vulnerability. The content of the security analysis reports 120 can be displayed on a dashboard user interface 122. The dashboard user interface 122 can present a security analysis summary, including the information contained in one or more security analysis reports 120. In some implementations, the dashboard user interface 122 includes security analysis summaries associated with one or more change requests 106 corresponding to one or more proposed changes 104 to one or more codebases 102.

Context-Aware Authorization Verification for API Endpoints

Figure 5:
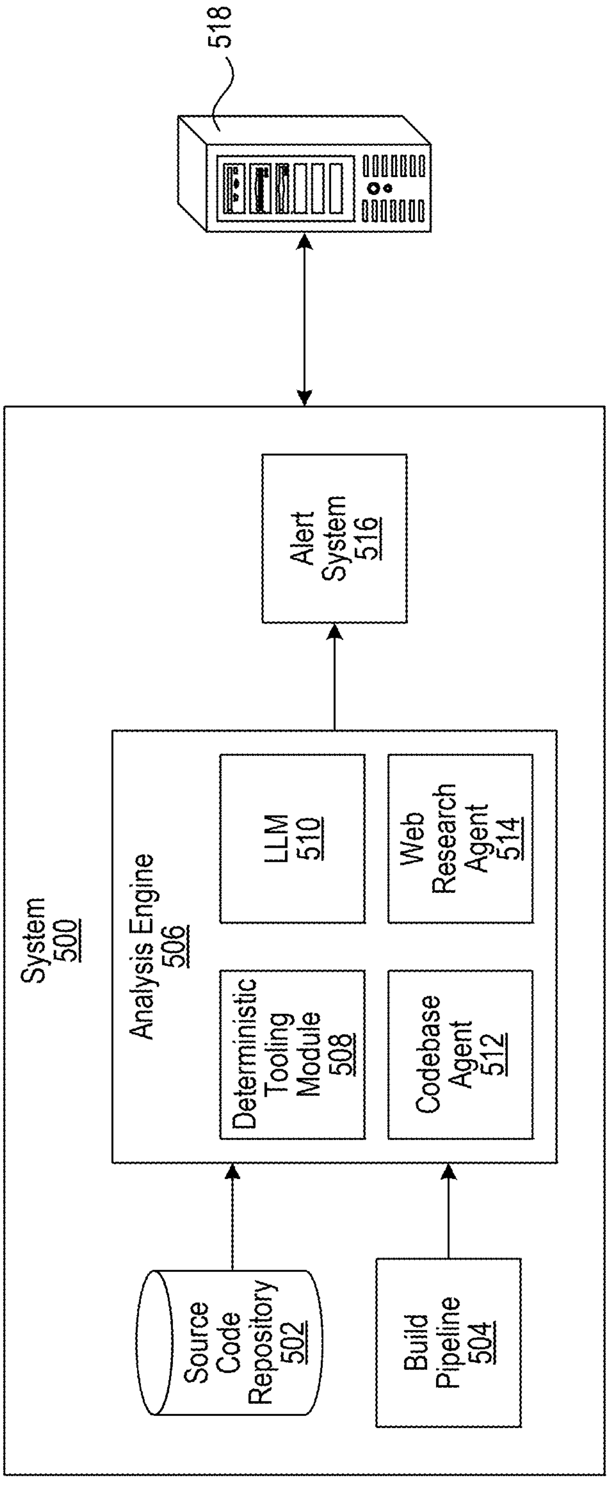
FIG. 5 is a block diagram that illustrates an example system that can implement aspects of the present technology.

FIG. 5 is a block diagram that illustrates an example system 500 that can implement aspects of the present technology. The system 500 includes a source code repository 502, a build pipeline 504, an analysis engine 506, an alert system 516, and a computer system 518. The analysis engine 506 includes a deterministic tooling module 508, an LLM 510, a codebase agent 512, and a web research agent

514. The system 500 can be implemented using example computer system 900 illustrated and described in more detail with reference to FIG. 9.

The system 500 provides context-aware authorization verification for API endpoints using the LLM 510 to analyze source code, service definition files, and metadata to determine whether appropriate authorization checks are present and transmitting alerts when authorization is lacking. The LLM 510 can be implemented using the components illustrated and described in more detail with reference to FIG. 8. The system 500 uses a safe default approach, defaulting to requiring an authorization check when the LLM 510 is uncertain whether an endpoint is private or public. When analyzing service definition files and metadata to determine whether an API handler is associated with a public endpoint, the system 500 can encounter situations where the metadata is ambiguous, incomplete, or absent. In such situations, the system 500 defaults to requiring an authorization check rather than assuming that the endpoint is private. Similarly, when the LLM 510 performs pattern recognition and semantic analysis on source code and cannot definitively determine that adequate authorization checks are present, the system 500 raises alerts rather than silently passing the code. The system 500 is biased toward false positives rather than false negatives, as false positives result in additional manual review while false negatives can result in dangerous vulnerabilities remaining undiscovered. Reviewers can then confirm if the flagged code is secure or if the warning is a false positive.

The system 500 can be configured to focus analysis on newly introduced code changes rather than flagging existing issues that were present before the current code change. When analyzing source code changes, the LLM 510 can determine whether a function represents a new endpoint being added to the codebase or a modification to an existing endpoint. This configuration enables the system 500 to provide actionable alerts to developers without overwhelming them with alerts for pre-existing authorization issues outside the scope of the current code change. The system 500 uses a two-tier authorization approach including a single-user privilege verification function for straightforward permission checks and a multi-privilege verification function for complex scenarios requiring multiple levels or types of authorization. The single-user privilege verification function ensures that a single user has the appropriate privilege before executing endpoint functionality, while the multi-privilege verification function verifies multiple privileges or roles at once. The LLM 510 can recognize both types of authorization functions when performing pattern recognition to determine whether source code includes direct calls to authorization functions.

The system 500 is designed to handle large codebases that would overwhelm human reviewers and traditional rule-based approaches. Large codebases can include thousands of implementation files, hundreds of service definition files, and complex authorization logic distributed across multiple files and function call chains. The system 500 can use agentic validation to autonomously traverse large codebases, locate relevant files, and validate authorization logic at scale. The LLM-based semantic analysis enables the system 500 to recognize authorization patterns that vary across different portions of the codebase without requiring manual configuration of rules for each pattern. The system 500 can analyze both human-written code and machine-generated code, enabling validation of authorization logic in codebases that include generated code produced by code generation tools, scaffolding frameworks, or automated code synthesis systems.

The source code repository 502 stores source code including implementation files and service definition files that are subject to authorization verification analysis. The implementation files contain application logic that implements API handlers, including functions that process incoming requests, interact with backend services, and return responses to clients. The service definition files include metadata and service interface definitions that specify how API endpoints are structured, what data types are used for requests and responses, and what access controls apply to each endpoint. The service definition files can include RPC framework definition files such as Apache Thrift definition files, Protocol Buffer definition files, and gRPC service definition files. The service definition files can also include IDL files that define service contracts, data structures, and method signatures in a language-agnostic format. The metadata within service definition files can include annotations specifying URL patterns, HTTP methods, role requirements, and access modifiers that indicate whether an endpoint is publicly accessible or restricted to internal services.

The source code repository 502 can store source code written in various programming languages, including Go, Java, Python, JavaScript, TypeScript, Rust, and C++, with corresponding service definition files appropriate for each language and framework. For example, a Go-based API can include implementation files located in an API directory such as /api that contain handler functions implementing API endpoints, and the source code repository 502 can store Thrift definition files that specify service interfaces and access annotations for those endpoints. The implementation files can import service interface definitions from the service definition files, establishing a reference between the application logic and the service contract. The system 500 applies authorization verification analysis to APIs in general, including REST APIs, GraphQL APIs, gRPC APIs, and other API architectures, rather than being limited to a specific programming language or service definition format.

The build pipeline 504 is an automated process that compiles, tests, and packages source code from the source code repository 502 into deployable software artifacts. The build pipeline 504 can trigger authorization verification analysis at various stages of the software development lifecycle, including when code changes are committed, when pull requests are created for code review, when branches are merged, and when release candidates are prepared for deployment. The build pipeline 504 can integrate with continuous integration and continuous deployment workflows to perform authorization verification analysis as part of automated quality gates.

Both the source code repository 502 and the build pipeline 504 can provide source code to the analysis engine 506 for processing. The analysis engine 506 can receive source code directly from the source code repository 502 for on-demand analysis, such as when a security team initiates a manual review of a specific codebase or when a developer requests analysis of a particular file or directory. The analysis engine 506 can also receive source code from the build pipeline 504 as part of automated workflows, such as when a continuous integration system triggers analysis after detecting code changes that affect API endpoints. The analysis engine 506 uses the implementation files and service definition files together to determine whether API handlers are associated with public endpoints and whether those handlers include appropriate authorization checks.

The analysis engine 506 performs context-aware authorization verification for API endpoints using a combination of deterministic analysis and LLM-based semantic analysis. The deterministic tooling module 508 performs rule-based analysis as part of the authorization verification process. The deterministic tooling module 508 can perform path analysis to verify if code is located in an API directory by examining a file path associated with an implementation file. For example, the deterministic tooling module 508 can analyze a file path/src/api/orders/handler.go and determine, based on the/api directory segment, that the file is located in an API directory and should be subject to authorization verification analysis. When the deterministic tooling module 508 determines that an implementation file is located in an API directory, it can infer that the implementation file is likely serving as a direct API endpoint.

The deterministic tooling module 508 can also perform import checking to determine if service definitions are imported in the implementation file. For example, the deterministic tooling module 508 can analyze import statements within a Go source file to determine whether the file imports an Apache Thrift service definition such as import userservice gen/thrift/user_service. The deterministic tooling module 508 can also detect imports of Protocol Buffer definitions such as import pb api/proto/order_service or gRPC service definitions. When an import statement referencing a service interface definition is present, the deterministic tooling module 508 determines that the source code implements an API handler. If no service definition import is present, the deterministic tooling module 508 can mark the file as not being an API for purposes of the authorization verification analysis.

The deterministic tooling module 508 can perform private versus public analysis by correlating functions with service definitions. This analysis involves examining service definition files to determine whether corresponding service methods are designated as private or public based on metadata contained within the service definition files. The metadata can include at least one access modifier indicating that an API handler is publicly accessible. For example, a Protocol Buffer definition file can include method options such as (google.api.http) that indicate a method is exposed as a public HTTP endpoint, while methods lacking such options can be designated as private or internal.

The private versus public analysis includes file contents analysis and/or in-memory analysis. The file contents analysis includes reading service definition files from storage to extract metadata, annotations, and service interface definitions. The in-memory analysis includes correlating the extracted metadata with functions identified in implementation files to determine whether each function implements a public or private endpoint. For example, the deterministic tooling module 508 can read a Thrift definition file from storage to extract annotations specifying URL patterns and access roles, then perform in-memory correlation to match those annotations with corresponding handler functions in the implementation file. As another example, the deterministic tooling module 508 can read a Protocol Buffer definition file containing gRPC service definitions and extract method-level options specifying authentication requirements, then correlate those options with the corresponding server-side method implementations.

The deterministic tooling module 508 can also examine function signatures, function annotations, and structural characteristics of functions to identify functions that serve as API endpoints. For example, the deterministic tooling module 508 can analyze annotations that specify HTTP methods, URL patterns, or role requirements applied to a function to determine that the function implements an API handler. As a more specific example, the deterministic tooling module 508 can detect a function annotated with @Route (/api/users/{id}, methods=[GET]) and determine that the function serves as a public API endpoint handling HTTP GET requests. The deterministic tooling module 508 can also identify API handlers by analyzing function signatures that accept HTTP request and response objects as parameters, such as func HandleOrder(w http. ResponseWriter, r \http.Request). The deterministic tooling module 508 can use a combination of general heuristics including the type of annotations applied to a function, the structure of the function, and the intended usage of the function to determine whether the function is likely an API endpoint. The deterministic tooling module 508 can also use positive and negative examples of API functions to tune the detection process for edge cases where function definitions are abnormal or difficult to detect using standard heuristics. For instance, the deterministic tooling module 508 can be trained with examples of internal utility functions that accept request objects but do not serve as direct API endpoints, enabling more accurate classification of similar edge cases.

The system 500 adapts its checks based on the presence of indicators such as imports, directory structure, or function naming before employing the LLM 510 to interpret meaning. For example, the deterministic tooling module 508 can analyze import statements to identify authorization libraries used in the codebase, analyze directory structure to identify files that implement API endpoints, and analyze function naming conventions to identify functions that are likely to perform authorization verification. The LLM 510 uses the indicators identified by the deterministic tooling module 508 to focus semantic analysis on relevant portions of the source code.

The LLM 510 within the analysis engine 506 can perform contextual analysis including pattern recognition to determine absence of direct calls to authorization functions and semantic analysis to determine absence of indirect authorization checks. The LLM 510 uses semantic understanding rather than rigid syntax matching to facilitate code comprehension, enabling it to understand and reason about the purpose, interactions, and capabilities of code rather than parsing for stringent structures. The LLM 510 can dynamically learn how code is structured, where to look to find answers, and how to reason about authorization approaches used inside an application without requiring predefined rules. The LLM 510 can recognize that a function named validateUserPermissions performs authorization even though it does not follow a standard naming convention such as checkAuth or requireRole. As another example, the LLM 510 can analyze a middleware chain and determine that authorization is handled by an upstream interceptor rather than within the handler function itself, even when the interceptor uses custom logic rather than a standard authorization library.

The LLM 510 can read function signatures, function bodies, and comments to infer if a function likely serves as an API endpoint. The LLM 510 examines functions in an implementation file using a combination of general heuristics including the type of annotations applied to the function, the structure of the function, and the intended usage of the function. For example, the LLM 510 can analyze a function with a comment stating//Internal helper for data transformation and determine that the function is not an API endpoint despite having a signature similar to handler functions. As another example, the LLM 510 can examine a function that accepts context and request parameters and returns a response object and, based on its registration in a router configuration, can determine that it serves as a public API endpoint. The determination of whether a function serves as an API endpoint is subtle because not all exported functions are API endpoints and some endpoints are exposed conditionally. For instance, the LLM 510 can recognize that a function is only registered as an endpoint when a feature flag is enabled, or that an exported function serves as a callback for internal event processing rather than external API access. The LLM 510 can also determine whether a function represents a new endpoint being added or a modification to an existing endpoint, enabling the system 500 to focus analysis on newly introduced code changes. The LLM 510 can be provided with positive and negative examples for tuning purposes when function definitions are highly abnormal and difficult to detect, enabling it to produce highly accurate results even in edge cases where function definitions deviate from standard patterns.

The LLM 510 can perform pattern recognition on source code to determine absence of a direct call to an authorization function. The authorization function can include a single-user privilege verification function that ensures a single user has the appropriate privilege, or a multi-privilege verification function that verifies multiple privileges or roles at once. For example, the LLM 510 can search for direct calls to known authorization functions such as functions named checkUserHasAccess or checkAccessMulti that perform privilege verification before executing endpoint functionality. When the LLM 510 identifies direct calls to such authorization functions, it can mark the function as having authorization. When the LLM 510 determines absence of direct calls to authorization functions, it proceeds to perform semantic analysis to determine absence of indirect authorization checks.

The semantic analysis includes analyzing the source code for markers including at least one of a user identifier or a context parameter. Context parameters can include user identifiers, session tokens, request metadata, authentication credentials, tenant identifiers, correlation identifiers for distributed tracing, timeout values, cancellation signals, and locale or language preferences. The LLM 510 looks for common markers such as userId and context variables while also being able to reason about other variables, their names, and their purpose. For example, the LLM 510 can analyze whether a function receives a context parameter containing user identity information and whether that context parameter is used to perform authorization verification before executing privileged operations. Determining absence of an indirect authorization check includes determining absence of session token verification and absence of role verification within the source code. The LLM 510 can trace the flow of token verification logic across multiple function calls to determine whether session token verification occurs directly within the handler function or indirectly through called functions. The LLM 510 can identify role verification logic that checks whether a user has a specific role such as Customer or Admin before allowing access to protected resources.

The system 500 performs the semantic analysis by analyzing gating conditions present in the source code. The LLM 510 can analyze conditional statements, guard clauses, and branching logic, which control access to protected functionality. For example, the LLM 510 can analyze whether a conditional statement checks user permissions before allowing execution of a privileged operation or whether the conditional statement serves a different purpose unrelated to authorization. The LLM 510 applies adaptive heuristics including broad reasoning about roles, tokens, or gating conditions to determine if they represent adequate authorization and can reason about whether a combination of checks collectively provides adequate authorization even when no single check matches a known authorization pattern.

The LLM 510 is prompted to understand synonyms or logically equivalent custom authorization checks beyond known patterns. The LLM 510 can interpret whether an imported function such as verifyPermissions is logically equivalent to a known authorization function such as checkUserHasAccess without requiring a direct pattern match or a manually configured rule. For example, the LLM 510 can determine that a function named validateUserAccess performs equivalent authorization verification to a function named checkAuthorization based on semantic analysis of the function's behavior and purpose. The LLM 510 can also examine source code to determine if equivalent authorization checks are performed indirectly, such as analyzing whether a handler function calls a middleware function that verifies session tokens or calls a service function that verifies user roles before performing a privileged operation. The ability to infer custom or indirect authorization logic represents a distinction between the LLM-based approach and pattern-based approaches that lack reasoning capabilities and cannot dynamically discover new authorization patterns.

The analysis engine 506 can determine that source code lacks an authorization check using agentic validation of a codebase associated with the source code. Agentic validation involves dispatching one or more agents to autonomously validate the source code to determine lack of an authorization check. An agent is an autonomous software component that performs specialized tasks independently while coordinating with other agents to achieve comprehensive results. The agents can operate within an agent and sub-agent hierarchy where agents and sub-agents have different tasks that the agents and sub-agents perform autonomously to validate authorization checks. The agent hierarchy enables the analysis engine 506 to distribute analysis tasks across specialized agents that can operate independently while coordinating to produce comprehensive authorization verification results.

The codebase agent 512 traverses the wider codebase associated with the source code to locate relevant files and validate authorization logic. The codebase agent 512 can be dispatched to autonomously validate source code to determine lack of an authorization check using agentic validation of the codebase. For example, when analyzing a Go implementation file located in an API directory, the codebase agent 512 can autonomously search the codebase to locate corresponding Thrift definition files that specify service interfaces and access annotations for the endpoints implemented in the Go file. The codebase agent 512 can navigate directory structures, follow import references, and trace dependencies to identify service definition files that are relevant to the implementation file under analysis. For example, the codebase agent 512 can autonomously traverse the codebase to locate a Thrift definition file user_service.thrift corresponding to an implementation file user_handler.go and extract access annotations.

The codebase agent 512 can locate hidden code paths that can bypass authorization checks including custom or generated code. The analysis engine 506 leverages deep knowledge of the customer's system architecture to identify code paths that are not immediately apparent from examining a single implementation file. For example, the codebase agent 512 can trace function call chains to identify intermediate functions that perform authorization verification on behalf of handler functions or identify generated code that implements authorization logic using patterns that differ from hand-written code.

The codebase agent 512 can correlate implementation files with service definition files to determine whether endpoints are designated as private or public. In some implementations, the codebase agent 512 reads service definition files from storage to extract metadata including annotations, access modifiers, and role requirements, then performs in-memory correlation to match extracted metadata with corresponding handler functions in implementation files. For example, the codebase agent 512 can read a Thrift service definition file to extract annotations such as api.url and api.roles that specify URL patterns and role requirements for an endpoint, then correlate those annotations with a handler function in a Go implementation file to determine that the handler function implements a public endpoint requiring authorization.

In some implementations, the web research agent 514 performs lookups and research to analyze technology or to analyze vulnerabilities, enabling the system 500 to understand the technology better or to understand vulnerabilities better. For example, the web research agent 514 can research authorization frameworks used in the codebase to understand how those frameworks implement authorization verification, enabling the analysis engine 506 to recognize authorization patterns specific to those frameworks. The web research agent 514 can also research known vulnerability patterns related to missing authorization checks and retrieve documentation for authorization libraries and patterns used in the codebase under analysis. When analyzing source code that uses a custom authorization framework, the web research agent 514 can research the framework's documentation to understand how authorization checks are implemented, enabling the LLM 510 to recognize authorization patterns that are specific to the framework.

The agents and sub-agents can operate concurrently to perform different aspects of authorization verification analysis. The codebase agent 512 can traverse the codebase to locate relevant files while the web research agent 514 performs lookups to research technology and vulnerabilities. The results from both agents can be provided to the LLM 510 to inform semantic analysis of the source code. The agent hierarchy enables the analysis engine 506 to scale authorization verification analysis to large codebases that can quickly overwhelm human reviewers and rule-based approaches.

The analysis engine 506 is connected to the alert system 516, which receives results from the analysis performed by the analysis engine 506. The alert system 516 is connected to the computer system 518. When the analysis engine 506 determines that source code implements an API handler associated with a public endpoint and that the source code lacks an authorization check, the alert system 516 transmits an alert to the computer system 518 indicating the identified authorization vulnerability. The alert can include information identifying the specific implementation file, the function implementing the API handler, the corresponding service definition file, and the metadata indicating that the endpoint is publicly accessible. For example, an alert can indicate that a handler function GetUserPaymentHistory in file/api/payments/handler.go implements a public endpoint specified in payment_service.thrift but lacks authorization checks. The computer system 518 can display the alert to security teams for manual review and validation.

The alert system 516 flags suspicious paths for manual validation to assist security teams in focusing their efforts on the most critical vulnerabilities. The alert system 516 can prioritize alerts based on factors including the severity of the potential vulnerability, the accessibility of the endpoint, the sensitivity of the data or operations protected by the endpoint, and the confidence level of the analysis. Security teams can use the prioritized alerts to allocate review resources to the most critical vulnerabilities first. The system 500 augments human review by identifying suspicious code paths that warrant manual validation, enabling security teams to focus their efforts on code that the system 500 has identified as potentially lacking authorization rather than reviewing the entire codebase manually. The system 500 errs on the side of caution in ambiguous cases, flagging code for manual review when conclusive evidence of authorization is absent, reducing the chance of missed vulnerabilities by leaning toward false positives rather than false negatives.

Figure 6:
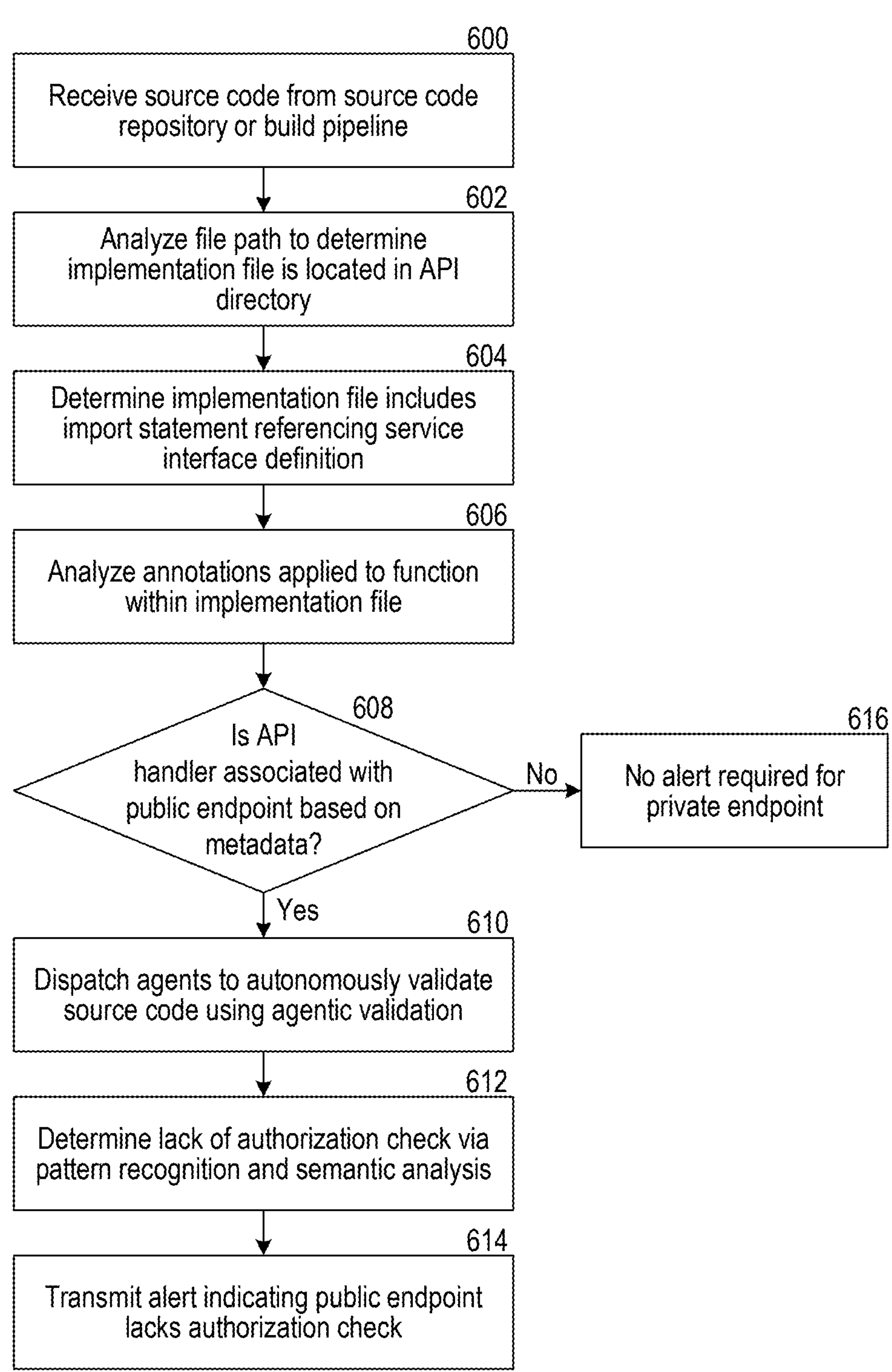
FIG. 6 is a flow diagram that illustrates an example method for performing context-aware authorization verification for application programming interface (API) endpoints in accordance with various embodiments of the present technology.

FIG. 6 is a flow diagram that illustrates an example method for performing context-aware authorization verification for API endpoints in accordance with various embodiments of the present technology. All or a subset of the method can be executed by an analysis engine, including a deterministic tooling module, an LLM, a codebase agent, and a web research agent. In some implementations, the process is performed by the system 500 illustrated and described in more detail with reference to FIG. 5. In some implementations, the process is performed by a computer system, e.g., example computer system 900 illustrated and described in more detail with reference to FIG. 9. Likewise, implementations can include different and/or additional steps or can perform the steps in different orders.

At step 600 a system receives source code from a source code repository or a build pipeline. The source code can include an implementation file and at least one service definition file. The service definition file includes metadata and a service interface definition that specifies how API endpoints are structured, what data types are used for requests and responses, and what access controls apply to each endpoint. The source code can include Go programming language code, Java code, Python code, or code written in other programming languages used for API development. The implementation file can contain handler functions that process incoming requests, interact with backend services, and return responses to clients. The service definition file can include an RPC framework definition file such as an Apache Thrift definition file, a Protocol Buffer definition file, or a gRPC service definition file. The service definition file can include an IDL file that defines service contracts, data structures, and method signatures in a language-agnostic format. The metadata within the service definition file can include annotations specifying URL patterns, HTTP methods, role requirements, and access modifiers that indicate whether an endpoint is publicly accessible or restricted to internal services.

The source code can originate from different sources depending on the analysis workflow. When a security team initiates a manual review of a specific codebase, the source code can be received directly from the source code repository for on-demand analysis. When a continuous integration system triggers analysis after detecting code changes that affect API endpoints, the source code can be received from the build pipeline as part of automated quality gates. The build pipeline can trigger authorization verification analysis when code changes are committed, when pull requests are created for code review, when branches are merged, or when release candidates are prepared for deployment.

At 602, the system analyzes a file path associated with the implementation file to determine whether the implementation file is located in an API directory. A deterministic tooling module can perform path analysis using simple rules to verify if the implementation file is located in an API directory. The path analysis can include examining whether the file path includes a directory segment such as/api or other directory naming conventions that indicate the file contains API endpoint implementations. For a Go-based API, implementation files can be located in an API directory such as/api that contains handler functions implementing API endpoints. When the deterministic tooling module determines that the implementation file is located in an API directory, the deterministic tooling module can infer that the implementation file is likely serving as a direct API endpoint and should be subject to authorization verification analysis. If the implementation file is not located in an API directory, the file is likely not serving as a direct API endpoint and can be excluded from authorization verification analysis.

At 604, the system determines that the implementation file includes an import statement referencing the service interface definition. The deterministic tooling module can perform import checking to determine if service definitions are imported in the implementation file. For example, the deterministic tooling module can analyze import statements within a Go source file to determine whether the file imports a gRPC service definition generated from a Protocol Buffer file. When the deterministic tooling module determines that the implementation file includes an import statement referencing the service interface definition, the deterministic tooling module can determine that the source code implements an API handler. If no service definition import is present, the deterministic tooling module can mark the file as not associated with an API handler for purposes of the authorization verification analysis. The import checking enables identification of implementation files that are associated with service contracts defined in external service definition files, establishing a reference between the application logic and the service contract.

At 606, the system analyzes annotations applied to a function within the implementation file. An LLM can examine function signatures, function annotations, and structural characteristics of functions to identify functions that serve as API endpoints. The LLM can be implemented using the components illustrated and described in more detail with reference to FIG. 8. The LLM can analyze annotations that specify HTTP methods, URL patterns, or role requirements applied to a function to determine that the function implements an API handler. For a Go-based API using Thrift, a function can be associated with annotations in the corresponding Thrift service definition file such as api.url specifying a URL pattern like/orders/:i and api.method specifying an HTTP method like POST.

The LLM can use a combination of general heuristics including the type of annotations applied to the function, the structure of the function, and the intended usage of the function to determine whether the function is likely an API endpoint. The LLM can also use positive and negative examples of API functions to tune the detection process for edge cases where function definitions are abnormal or difficult to detect using standard heuristics. The positive examples can include functions that are known to serve as API endpoints, while the negative examples can include functions that are not API endpoints despite having similar structural characteristics. The determination of whether a function serves as an API endpoint can be subtle because not all exported functions are API endpoints and some endpoints are exposed conditionally. The LLM can also determine whether a function represents a new endpoint being added to the codebase or a modification to an existing endpoint that was previously present, enabling the system to focus analysis on newly introduced code changes rather than flagging existing issues that were present before the current code change.

At 608, the system determines whether the API handler is associated with a public endpoint based on metadata. The deterministic tooling module can perform private versus public analysis by correlating functions with service definitions to determine whether corresponding service methods are designated as private or public based on metadata contained within the service definition files. The metadata can include at least one access modifier indicating that the API handler is publicly accessible. For example, a Thrift service definition file can include annotations such as api.url that indicate a method is exposed as a public endpoint, while methods lacking such annotations can be designated as private or internal. A method definition such as GetSummaryResponse ProcessOrder(1: OrderRequest request) (api.url=/orders/:i, api.method=POST, api.roles=Customer) indicates that the ProcessOrder method is a public endpoint accessible at the specified URL pattern with the specified HTTP method and role requirements. The presence of the api.url annotation indicates that the endpoint is publicly accessible and requires authorization verification, while the api.roles annotation specifies role requirements that indicate what authorization checks should be present in the implementation. A codebase agent can read service definition files from storage to extract metadata including annotations, access modifiers, and role requirements, then perform in-memory correlation to match extracted metadata with corresponding handler functions in implementation files.

If the API handler is not associated with a public endpoint based on the metadata analysis, no alert is required for a private endpoint (Step 616). When the analysis determines that the API handler is associated with a private endpoint based on metadata from the service definition file, the system can conclude that no external authorization is required for the endpoint. Private endpoints can be restricted to internal services and do not require the same authorization checks as public endpoints that are accessible to external clients. The system uses a safe default approach where the system defaults to requiring an authorization check when uncertain whether an endpoint is private or public. Unless the system is able to definitively assert that the endpoint is private and does not require authorization, the system assumes the endpoint requires authorization to avoid risking missing an authorization flaw by incorrectly classifying a public endpoint as private. If the API handler is associated with a public endpoint, the system proceeds to Step 610.

At 610, the system dispatches agents to autonomously validate the source code using agentic validation when the API handler is associated with a public endpoint. The codebase agent can be dispatched to autonomously navigate and analyze the wider codebase to locate relevant service definition files for API endpoint files. The codebase agent traverses the wider codebase associated with the source code to locate relevant files and validate authorization logic. For example, when analyzing a Python implementation file located in an API directory, the codebase agent can autonomously search the codebase to locate corresponding Protocol Buffer definition files that specify service interfaces and access annotations for the endpoints implemented in the Python file. The codebase agent can navigate directory structures, follow import references, and trace dependencies to identify service definition files that are relevant to the implementation file under analysis. The codebase agent can locate hidden code paths that can bypass authorization checks including custom or generated code by leveraging deep knowledge of the system architecture.

A web research agent can be dispatched to perform lookups on the wider web to research technology and understand vulnerabilities better. The web research agent performs lookups and research to analyze technology or to analyze vulnerabilities, enabling the system to understand the technology better or to understand vulnerabilities better. For example, the web research agent can research authorization frameworks used in the codebase to understand how those frameworks implement authorization verification, enabling recognition of authorization patterns specific to those frameworks. The web research agent can research known vulnerability patterns related to missing authorization checks to enhance the analysis. The web research agent can retrieve documentation for authorization libraries, frameworks, and patterns used in the codebase under analysis, enabling recognition of authorization patterns that are specific to custom frameworks. The agents and sub-agents can operate concurrently to perform different aspects of authorization verification analysis, and the results from the codebase agent and the web research agent can be provided to the LLM to inform semantic analysis of the source code. The agent hierarchy enables scaling of authorization verification analysis to large codebases that can quickly overwhelm human reviewers and rule-based approaches.

At 612, the system determines that an authorization check is missing, e.g., using pattern recognition and semantic analysis. The LLM can perform pattern recognition on the source code to determine absence of a direct call to an authorization function. The authorization function can include a single-user privilege verification function that ensures a single user has the appropriate privilege, such as checkUserHasAccess, or a multi-privilege verification function that verifies multiple privileges or roles at once, such as checkAccessMulti. When direct calls to such authorization functions are identified, the function can be marked as having authorization. When absence of direct calls to authorization functions is determined, the LLM proceeds to perform semantic analysis to determine absence of indirect authorization checks.

The system can perform semantic analysis by analyzing the source code for markers including a user identifier or a context parameter. Common markers such as userId and context variables are analyzed while also reasoning about other variables, their names, and their purpose. For example, the LLM can analyze whether a function receives a context parameter containing user identity information and whether that context parameter is used to perform authorization verification before executing privileged operations.

The system can determine absence of an indirect authorization check by determining absence of session token verification within the source code. The LLM can analyze whether the source code verifies session tokens, authentication tokens, or other credentials that establish user identity before performing privileged operations. The flow of token verification logic can be traced across multiple function calls to determine whether session token verification occurs directly within the handler function or indirectly through called functions. The system can determine absence of an indirect authorization check by determining absence of role verification within the source code. The LLM can analyze whether the source code verifies user roles, permissions, or access levels before executing endpoint functionality. Role verification logic that checks whether a user has a specific role such as Customer or Admin before allowing access to protected resources can be identified.

The system can perform semantic analysis by analyzing gating conditions present in the source code. Conditional statements, guard clauses, and branching logic that control access to protected functionality can be analyzed. Whether gating conditions represent adequate authorization can be determined by reasoning about the purpose and effect of each condition. For example, the LLM can analyze whether a conditional statement checks user permissions before allowing execution of a privileged operation, or whether the conditional statement serves a different purpose unrelated to authorization.

The LLM applies adaptive heuristics including broad reasoning regarding roles, tokens, or gating conditions to determine if they represent adequate authorization. The adaptive heuristics enable adaptation of checks based on the presence of other indicators such as imports, directory structure, or function naming, and then interpretation of meaning from those indicators. Whether a combination of checks collectively provides adequate authorization can be determined even when no single check matches a known authorization pattern.

The LLM can be prompted to understand synonyms or logically equivalent custom authorization checks beyond known patterns. For example, the LLM can be prompted with Analyze whether the function verifyPermissions performs authorization checks equivalent to the standard 'checkUserHasAccess' function by examining its implementation and determining if it validates user credentials, roles, or access rights before allowing the operation to proceed. Whether an imported function such as verifyPermissions is logically equivalent to a known authorization function such as checkUserHasAccess can be interpreted without requiring a direct pattern match or a manually configured rule. Custom authorization logic implemented using non-standard function names, custom frameworks, or multi-step verification processes that do not conform to recognizable patterns can be recognized. For example, the LLM can be prompted with "Determine if the following code path implements authorization by tracing the call chain and identifying any functions that check user identity, validate tokens, verify role membership, or enforce access control policies, regardless of the function names used." As another example, a function named validateUserAccess can be determined to perform equivalent authorization verification to a function named checkAuthorization based on semantic analysis of the function's behavior and purpose.

The LLM can examine source code to determine if equivalent authorization checks are performed indirectly. For example, the LLM can analyze whether a handler function (e.g., a function CreateOrder that processes incoming HTTP POST requests to create new orders and returns order confirmation to clients) calls other functions that eventually lead to a permission check, even when the handler function does not directly call a known authorization function. Authorization logic can be traced across function call chains to determine whether authorization verification occurs at some point before privileged operations are executed.

At 614, the system transmits an alert indicating that the public endpoint lacks an authorization check. In response to determining that the API handler is associated with a public endpoint and that the source code lacks an authorization check, the alert system can generate an alert indicating that the source code implements an API handler associated with a public endpoint and that the source code lacks an authorization check. The computer system can display the alert to security teams for manual review and validation. The alert can include information identifying the specific implementation file, the function implementing the API handler, the corresponding service definition file, and the metadata indicating that the endpoint is publicly accessible.

The system errs on the side of caution by flagging code for manual review in the absence of conclusive evidence of authorization. When pattern recognition and semantic analysis are performed on source code and adequate authorization checks cannot be definitively determined to be present, alerts are raised rather than silently passing the code. The system is designed to lean toward false positives rather than false negatives, as false positives result in additional manual review while false negatives can result in dangerous vulnerabilities remaining undiscovered. Reviewers can then confirm if the flagged code is secure or if the warning is a false positive.

Suspicious paths can be flagged for manual validation to assist security teams in focusing their efforts on the most critical vulnerabilities. Alerts can be prioritized based on factors including the severity of the potential vulnerability, the accessibility of the endpoint, the sensitivity of the data or operations protected by the endpoint, and the confidence level of the analysis. Security teams can use the prioritized alerts to allocate review resources to the most critical vulnerabilities first. The system augments human review by identifying suspicious code paths that warrant manual validation, enabling security teams to focus their efforts on code that the system has identified as potentially lacking authorization rather than reviewing the entire codebase manually.

At 616, no alert is required for a private endpoint. When the API handler is determined to be associated with a private endpoint based on metadata from the service definition file, the system concludes that no external authorization is required for the endpoint. Private endpoints can be restricted to internal services and do not require the same authorization checks as public endpoints that are accessible to external clients. The system proceeds to Step 616 when the determination at Step 608 indicates that the API handler is not associated with a public endpoint based on the metadata analysis.

Although the Steps 600-616 of the method are discussed and illustrated in a particular order, the method is not so limited. In other implementations, all or a subset of one or more of the Steps 600-616 of the method can be performed in a different order. In these and other implementations, all or a subset of any of the Steps 600-616 of the method can be performed before, during, or after all or a subset of any of the other Steps 600-616 of the method. Furthermore, a person skilled in the art will readily recognize that the method can be altered and still remain within these and other implementations of the present technology. For example, all or a subset of one or more Steps 600-616 of the method can be omitted or repeated in some implementations.

Figure 7:
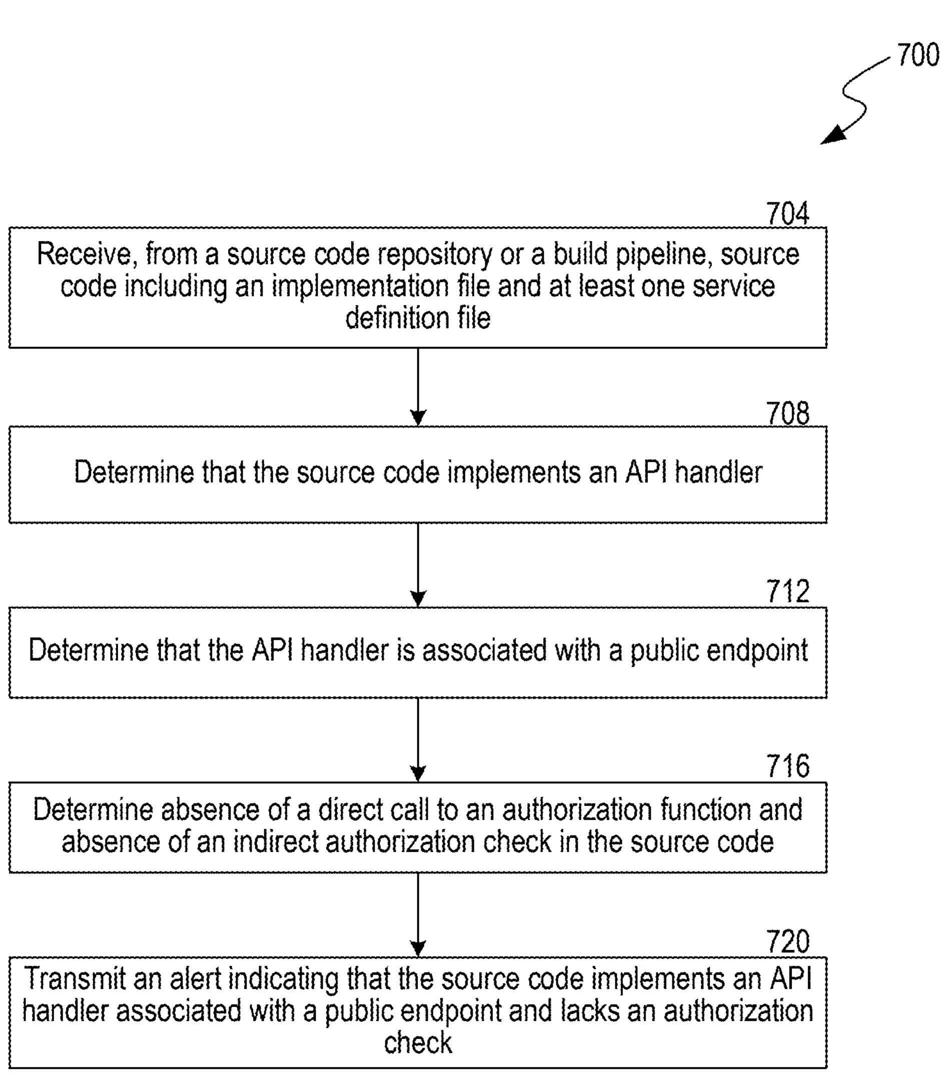
FIG. 7 is a flow diagram that illustrates an example process for context-aware authorization verification for API endpoints in accordance with various embodiments of the present technology.

FIG. 7 is a flow diagram that illustrates an example process for context-aware authorization verification for API endpoints in accordance with various embodiments of the present technology. In some implementations, the process is performed by the system 500 illustrated and described in more detail with reference to FIG. 5. In some implementations, the process is performed by a computer system, e.g., example computer system 900 illustrated and described in more detail with reference to FIG. 9. Likewise, implementations can include different and/or additional steps or can perform the steps in different orders.

At 704, a system receives source code from a source code repository or a build pipeline. A build pipeline is an automated process that compiles, tests, and packages source code from a repository into deployable software artifacts, typically triggered by code commits or scheduled events. The source code can include an implementation file and one or more service definition files. The service definition file(s) include metadata and a service interface definition. For example, the source code implements a Go-based API with endpoints placed in an/api directory. Some endpoints may be publicly exposed, while others are fully internal or private to specific services. The Go programming language code can include function definitions with receiver methods, struct types for request and response handling, and import statements referencing Thrift service definitions that enable communication between different services within the application architecture. In some cases, a function may call checkUserHasAccess, which ensures that a single user has the appropriate privilege, or checkAccessMulti, which verifies multiple privileges or roles at once.

The system can check whether the service definition file(s) import an Apache Thrift service. Apache Thrift service is a cross-language serialization and RPC framework that enables communication between different services. The service definition file can be stored as a separate IDL file or library that specifies service endpoints, data types, and access modifiers that determine whether an endpoint should be publicly accessible or restricted. The RPC framework definition file can include service method signatures, request and response data structures, and annotations such as api.url that indicate the endpoint's accessibility level. The metadata can include api.url annotations that indicate whether the endpoint is public.

At 708, the system determines that the source code implements an API handler by determining that the implementation file includes a reference to the service interface definition. For example, the system uses a file access tool which retrieves and checks whether a given file is in the/api directory, and if it is not, the file is likely not serving as a direct API endpoint. The system can also check if the file imports a gRPC service generated from a Protocol Buffer definition, and if no such import is present, it is marked as not an API for analysis. The system can examine each function in the file to decide if it is likely an API endpoint using a combination of general heuristics such as the type of annotations applied to the function, the structure of the function, or its intended usage.

In some implementations, the system determines that the implementation file includes a reference to the service interface definition by analyzing a file path associated with the implementation file to determine whether the implementation file is located in an API directory. The system can determine whether the implementation file includes an import statement referencing the service interface definition. For example, the system uses deterministic tooling including path analysis using simple rules to verify if the code is in the/api directory and import check to determine if Thrift services are imported. The file path can include directory structures such as/api/handlers or/api/services, and the import statement can reference a Thrift service definition file that defines the service interface.

In some implementations, the system determines that the source code implements an API handler by analyzing annotations applied to a function within the implementation file. Annotations applied to functions within implementation files can indicate that the function serves as an API handler. For example, Thrift service annotations can include api.url annotations specifying the route path such as/orders/: i, api.method annotations specifying the HTTP method such as POST or GET, and api.roles annotations specifying access control parameters such as Customer or Admin. These annotations indicate the endpoint's accessibility level and help the system determine whether the API handler is associated with a public or private endpoint.

The system can examine functions in a file to decide if it is likely an API endpoint using a combination of general heuristics such as the type of annotations applied to the function, the structure of the function, or its intended usage. This determination can be subtle, because not all exported functions are API endpoints and some endpoints are exposed conditionally. A Thrift service file can indicate that the function is a public endpoint due to the api.url annotations, and the function can include annotations specifying HTTP methods, route paths, or access control parameters that indicate the function serves as an API handler.

At 712, the system uses the metadata to determine that the API handler is associated with a public endpoint. Metadata included in service definition files can indicate whether an API handler is publicly accessible or restricted. For example, metadata can include api.url annotations that specify the endpoint's route path, api.method annotations that specify HTTP methods such as POST or GET, and access modifiers such as public, private, or internal designations that specify the intended visibility of the endpoint. The system uses these metadata elements to determine whether authorization verification is required for the corresponding API handler.

In some implementations, the metadata includes at least one access modifier indicating that the API handler is publicly accessible. Access modifiers can include public, private, or internal designations that specify the intended visibility of the endpoint, and the system uses these modifiers to determine whether authorization verification is required for the corresponding API handler. For example, the system parses Protocol Buffer definition files to analyze access modifiers and google.api.http annotations associated with the corresponding service or method to determine whether the endpoint is designated as private or public. The Protocol Buffer definitions can be stored in separate .proto files that specify service endpoints, message types, and access modifiers that determine whether an endpoint should be publicly accessible or restricted. If the method is strictly private, the system concludes that no external authorization is needed, and if it is public or if the system is uncertain, the system defaults to requiring an authorization check.

At 716, the system uses an LLM to determine that the source code lacks an authorization check. The LLM can be implemented using the components illustrated and described in more detail with reference to FIG. 8. The system can use the LLM to perform pattern recognition on the source code to determine absence of a direct call to an authorization function. Pattern recognition performed by the LLM can include identifying direct calls to known authorization functions such as checkUserHasAccess or checkAccessMulti. The system also recognizes patterns such as calls to verifyPermissions( ), checkAuthorization( ), or other logically equivalent functions that perform permission checks. Additionally, the system identifies patterns involving session token validation, role verification, and gating conditions that control access to protected resources.

The system can use the LLM to perform semantic analysis on the source code to determine absence of an indirect authorization check. If no direct calls are found, the LLM examines the code to see if equivalent checks might be performed indirectly, for example, verifying session tokens, verifying roles, or calling other functions that eventually lead to a permission check. The LLM can be prompted to look for known patterns or to understand synonyms or logically equivalent custom checks, and can apply broad reasoning about roles, tokens, or gating conditions that might be present in the code, concluding if they represent adequate authorization. The LLM-based system uses semantic understanding rather than rigid syntax matching to facilitate code comprehension, meaning it understands and can reason about the purpose, interactions, and capabilities of code rather than parsing for stringent structures. The LLM looks for common markers such as userId and context though it is able to reason about other variables, their names, and their purpose as well.

In some implementations, the system determines that the source code lacks an authorization check using agentic validation of a codebase associated with the source code. The system can use agents and sub-agents that have different tasks that they perform autonomously. For instance, one agent may examine the wider codebase. The agents can research the code endpoints and determine whether the code is using the authorization parameters correctly, and whether the library or the function handling is happening appropriately or not, providing agentic validation for proper usage of authorization functions. Large, generated codebases can quickly overwhelm human reviewers and traditional static application security testing (SAST) rules. Yet, the LLM-based methods disclosed herein perform efficiently in these environments, uncovering logic flaws that other methods miss. In some implementations, the system determines that the source code lacks an authorization check by dispatching one or more agents to autonomously validate the source code. An agent can traverse out to the wider web and perform lookups (e.g., research) to analyze the technology or to analyze vulnerabilities.

In some implementations, the system performs the semantic analysis by analyzing the source code for markers including a user identifier or a context parameter. For example, the LLM looks for common markers such as userId and context, although it is able to reason about other variables, their names, and their purpose as well. The LLM can apply broad reasoning regarding roles, tokens, or gating conditions that might be present in the code, concluding whether they represent adequate authorization. The markers can include function parameters such as ctx representing a context object, userID representing a user identifier, or sessionToken representing authentication credentials, and the system analyzes how these markers are used within the function to determine whether appropriate authorization verification is performed.

In some implementations, the authorization function includes a single-user privilege verification function or a multi-privilege verification function. A function can call checkUserHasAccess, which ensures a single user has the appropriate privilege, or checkAccessMulti, which verifies multiple privileges or roles at once to ensure the correct privileges are checked before executing the endpoint's functionality. This two-tier approach enables the system to address both straightforward permission checks and more complex scenarios where multiple levels or types of authorization may be required. If the endpoint should have authorization, the LLM first looks for direct calls to known authorization functions such as checkUserHasAccess or checkAccessMulti, and if these are present, it marks the function as having authorization.

In some implementations, the system determines absence of an indirect authorization check by determining absence of session token verification within the source code. If no direct calls are found, the LLM examines the code to determine whether equivalent checks might be performed indirectly, for example, verifying session tokens, verifying roles, or calling other functions that eventually lead to a permission check. The system can infer custom and indirect checks, such as role or token validation. For example, the LLM can apply broad reasoning regarding roles, tokens, or gating conditions that might be present in the code, concluding whether they represent adequate authorization. Session token verification can include validating JSON Web Token (JWT) tokens, checking authentication cookies, or verifying bearer tokens passed in request headers, and the absence of such verification logic indicates a potential authorization vulnerability. In some implementations, the system determines absence of an indirect authorization check by determining absence of role verification within the source code. Role verification can include checking user role assignments such as administrator, editor, or viewer, validating role-based access control lists, or verifying that a user belongs to an authorized group before permitting access to protected resources.

In some implementations, the system performs the semantic analysis by analyzing gating conditions present in the source code. Gating conditions can include conditional statements that check user permissions before executing protected logic, if-else blocks that verify access levels, or guard clauses that return early when authorization requirements are not satisfied, and the system analyzes whether such conditions adequately protect the API endpoint from unauthorized access.

At 720, in response to determining that the API handler is associated with a public endpoint and that the source code lacks an authorization check, the system generates and transmits an alert to a computer system, indicating that the source code implements an API handler associated with a public endpoint and that the source code lacks an authorization check. In ambiguous cases, the system raises alerts rather than silently passing, and reviewers can then confirm whether the flagged code is secure or if the warning is a false positive. In the absence of conclusive evidence, the LLM errs on the side of caution, flagging the code for manual review, as it is safer to have a false positive than to miss a real vulnerability. The system can flag suspicious paths for manual validation, assisting security teams in focusing their efforts on the most critical vulnerabilities.

Artificial Intelligence System

To assist in understanding the present disclosure, some concepts relevant to artificial intelligence (AI) including neural works and machine learning (ML) are discussed herein. Generally, a neural network comprises a number of computation units (sometimes referred to as neurons). Each neuron receives an input value and applies a function to the input to generate an output value. The function typically includes a parameter (also referred to as a weight) whose value is learned through the process of training. A plurality of neurons may be organized into a neural network layer (or simply layer) and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term ML-based model or more simply ML model may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., source code repositories or security vulnerability databases), and/or may encompass another domain or domains, be they larger or smaller than a single language or subject domain. For example, a relatively large, multilingual, and non-subject-specific corpus may be created by extracting text from online webpages, publicly available social media posts, and/or open source code repositories. Training data may be annotated with ground truth labels (e.g., each data entry in the training dataset may be paired with a label indicating presence or absence of authorization checks), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (e.g., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., learn) the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as inference).

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term language model has been commonly used to refer to an ML-based language model, there could exist non-ML language models. In the present disclosure, the term language model may be used as shorthand for an ML-based language model (e.g., a language model that is implemented using a neural network or other ML architecture), unless stated otherwise. For example, unless stated otherwise, the language model encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or, in the case of a large language model (LLM), may contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (e.g., the order of the input data is meaningful, which is the case for most text input). Although transformer-based language models are described herein, it should be understood that the present disclosure may be applicable to any ML-based language model, including language models based on other neural network architectures such as RNN-based language models.

FIG. 8 is a block diagram that illustrates an example transformer 812 in accordance with various embodiments of the present technology. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any ML-based language model, including language models based on other neural network architectures such as RNN-based language models.

The transformer 812 includes an encoder 808 (which can comprise one or more encoder layers/blocks connected in series) and a decoder 810 (which can comprise one or more decoder layers/blocks connected in series). Generally, the encoder 808 and the decoder 810 each include a plurality of neural network layers, at least one of which can be a self-attention layer. The parameters of the neural network layers can be referred to as the parameters of the language model.

The transformer 812 can be trained to perform certain functions on a natural language input. For example, the functions include analyzing source code, identifying security vulnerabilities, and performing contextual reasoning about code structure and logic. Analyzing source code can include examining implementation files and service definition files to understand API endpoint definitions and authorization requirements. Identifying security vulnerabilities can include detecting missing or incorrectly implemented authorization checks that pattern-based approaches may overlook. Performing contextual reasoning can include determining whether code contains direct calls to known authorization functions or indirect authorization logic such as verifying session tokens, verifying roles, or calling other functions that eventually lead to a permission check. The transformer 812 can use semantic understanding rather than rigid syntax matching to facilitate code comprehension, understanding and reasoning about the purpose, interactions, and capabilities of code rather than parsing for stringent structures. In some implementations, the transformer 812 is trained to perform certain functions on other input formats than natural language input. For example, the input can include source code files, interface definition language files, service definition files, or a combination thereof.

The transformer 812 can be trained on a text corpus that is labeled (e.g., annotated to indicate verbs, nouns) or unlabeled. LLMs can be trained on a large unlabeled corpus. The term language model, as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input) and code analysis tasks (e.g., analyzing source code to identify security vulnerabilities or missing authorization checks). FIG. 8 illustrates an example of how the transformer 812 can process textual input data. Input to a language model (whether transformer-based or otherwise) typically is in the form of natural language or source code that can be parsed into tokens. It should be appreciated that the term token in the context of language models and NLP has a different meaning from the use of the same term in other contexts such as data security. Tokenization, in the context of language models and NLP, refers to the process of parsing textual input (e.g., a character, a word, a phrase, a sentence, a paragraph, a line of code, a function name) into a sequence of shorter segments that are converted to numerical representations referred to as tokens (or compute tokens). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word or a code element such as a function name, variable, or operator.

For example, the word greater can be represented by a token for [great] and a second token for [er]. In another example, the text sequence "write a summary" can be parsed into the segments [write], [a], and [summary], each of which can be represented by a respective numerical token. Similarly, a code sequence such as checkUserHasAccess (ctx) can be parsed into segments such as [check], [User], [Has], [Access], [(], [ctx], and [)], each represented by respective tokens. In addition to tokens that are parsed from the textual sequence (e.g., tokens that correspond to words, punctuation, or code elements), there can also be special tokens to encode non-textual information. For example, a [CLASS] token can be a special token that corresponds to a classification of the textual sequence (e.g., can classify the textual sequence as a list, a paragraph, or a code block), an [EOT] token can be another special token that indicates the end of the textual sequence, other tokens can provide formatting information, etc.

In FIG. 8, a short sequence of tokens 802 corresponding to the input text is illustrated as input to the transformer 812. Tokenization of the text sequence into the tokens 802 can be performed by some pre-processing tokenization module such as, for example, a byte-pair encoding tokenizer (the pre referring to the tokenization occurring prior to the processing of the tokenized input by the LLM), which is not shown in FIG. 8 for simplicity. In general, the token sequence that is inputted to the transformer 812 can be of any length up to a maximum length defined based on the dimensions of the transformer 812. Each token 802 in the token sequence is converted into an embedding vector 806 (also referred to simply as an embedding 806). An embedding 806 is a learned numerical representation (such as, for example, a vector) of a token that captures some semantic meaning of the text segment or code element represented by the token 802. The embedding 806 represents the text segment or code element corresponding to the token 802 in a way such that embeddings corresponding to semantically related text or code are closer to each other in a vector space than embeddings corresponding to semantically unrelated text or code. For example, assuming that the words "write," "a," and "summary" each correspond to, respectively, a "write" token, an "a" token, and a "summary" token when tokenized, the embedding 806 corresponding to the "write" token will be closer to another embedding corresponding to the "jot down" token in the vector space as compared to the distance between the embedding 806 corresponding to the "write" token and another embedding corresponding to the "summary" token. Similarly, in the context of code analysis, an embedding corresponding to a checkUserHasAccess token can be closer to an embedding corresponding to a verifyPermissions token than to an embedding corresponding to an unrelated function name, enabling the transformer 812 to recognize semantically equivalent authorization functions even when they use different naming conventions.

The vector space can be defined by the dimensions and values of the embedding vectors. Various techniques can be used to convert a token 802 to an embedding 806. For example, another trained ML model can be used to convert the token 802 into an embedding 806. In particular, another trained ML model can be used to convert the token 802 into an embedding 806 in a way that encodes additional information into the embedding 806 (e.g., a trained ML model can encode positional information about the position of the token 802 in the text sequence into the embedding 806). In some examples, the numerical value of the token 802 can be used to look up the corresponding embedding in an embedding matrix 804 (which can be learned during training of the transformer 812).

The generated embeddings 806 are input into the encoder 808. The encoder 808 serves to encode the embeddings 806 into feature vectors 814 that represent the latent features of the embeddings 806. The encoder 808 can encode positional information (e.g., information about the sequence of the input) in the feature vectors 814. The feature vectors 814 can have very high dimensionality (e.g., on the order of thousands or tens of thousands), with each element in a feature vector 814 corresponding to a respective feature. The numerical weight of each element in a feature vector 814 represents the importance of the corresponding feature. The space of all possible feature vectors 814 that can be generated by the encoder 808 can be referred to as the latent space or feature space.

Conceptually, the decoder 810 is designed to map the features represented by the feature vectors 814 into meaningful output, which can depend on the task that was assigned to the transformer 812. For example, if the transformer 812 is used for a code analysis task, the decoder 810 can map the feature vectors 814 into output indicating whether source code contains appropriate authorization checks or identifying potential security vulnerabilities. Generally, in a generative language model, the decoder 810 serves to decode the feature vectors 814 into a sequence of tokens. The decoder 810 can generate output tokens 816 one by one. Each output token 816 can be fed back as input to the decoder 810 in order to generate the next output token 816. By feeding back the generated output and applying self-attention, the decoder 810 is able to generate a sequence of output tokens 816 that has sequential meaning (e.g., the resulting output text sequence is understandable as a sentence and obeys grammatical rules, or the resulting output provides coherent analysis of code structure and security logic). The decoder 810 can generate output tokens 816 until a special [EOT] token (indicating the end of the text) is generated. The resulting sequence of output tokens 816 can then be converted to a text sequence in post-processing. For example, each output token 816 can be an integer number that corresponds to a vocabulary index. By looking up the text segment using the vocabulary index, the text segment corresponding to each output token 816 can be retrieved, the text segments can be concatenated together, and the final output text sequence can be obtained.

In some examples, the input provided to the transformer 812 includes instructions to perform a function on an existing text or source code. The output can include, for example, a modified version of the input text, instructions to modify the text, or an analysis of the input. The analysis can include identifying security vulnerabilities, determining whether authorization checks are present, or detecting missing or incorrectly implemented authorization logic. For example, the input can include source code for an API handler and the output can include an indication of whether the source code contains appropriate authorization checks or a determination that the code lacks an authorization check and should be flagged for manual review.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs. Other LLMs can be trained or fine-tuned on code-based datasets to enable the model to perform code analysis tasks such as identifying security vulnerabilities or determining whether source code contains appropriate authorization checks.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. For example, a prompt for code analysis can include examples of source code with proper authorization checks and source code lacking authorization checks to guide the LLM in identifying similar patterns. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Computer System

Figure 9:
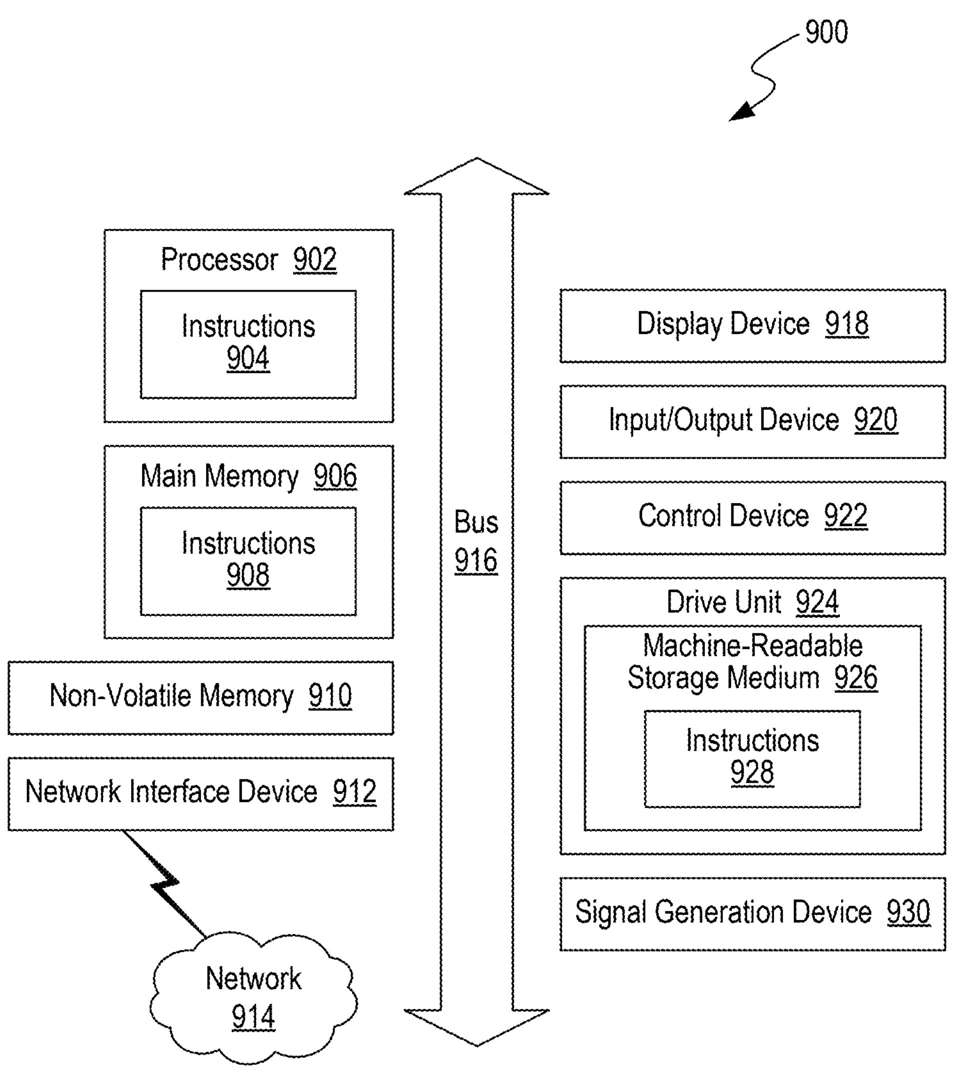
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a video display device 918, an input/output device 920, a control device 922 (e.g., keyboard and pointing device), a drive unit 924 that includes a machine-readable (storage) medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementations, the computer system 900 can be an embedded computer system, a system-on-chip (SOC), a single-board computer system (SBC), or a distributed system such as a mesh of computer systems, or it can include one or more cloud components in one or more networks. Where appropriate, one or more computer systems 900 can perform operations in real time, in near real time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions, when executed by at least one data processor of a system, cause the system to perform operations including:

receiving, from a source code repository or a build pipeline, source code including an implementation file and at least one service definition file, wherein the at least one service definition file includes metadata and a service interface definition;

determining that the source code implements an Application Programming Interface (API) handler by:

determining that the implementation file includes a reference to the service interface definition;

determining, based on the metadata, that the API handler is associated with a public endpoint;

determining, using a large language model, that the source code lacks an authorization check by:

performing pattern recognition on the source code to determine absence of a direct call to an authorization function; and performing semantic analysis on the source code to determine absence of an indirect authorization check; and responsive to determining that the API handler is associated with a public endpoint and that the source code lacks an authorization check, transmitting, to a computer system, an alert indicating that the source code implements an API handler associated with a public endpoint and that the source code lacks an authorization check.

2. The non-transitory, computer-readable storage medium of claim 1, wherein determining that the implementation file includes a reference to the service interface definition includes:

analyzing a file path associated with the implementation file to determine that the implementation file is located in an API directory; and determining that the implementation file includes an import statement referencing the service interface definition.

3. The non-transitory, computer-readable storage medium of claim 1, wherein determining that the source code lacks an authorization check is performed using agentic validation of a codebase associated with the source code.

4. The non-transitory, computer-readable storage medium of claim 1, wherein the at least one service definition file includes a remote procedure call (RPC) framework definition file.

5. The non-transitory, computer-readable storage medium of claim 1, wherein determining that the source code implements an API handler is performed by analyzing annotations applied to a function within the implementation file.

6. The non-transitory, computer-readable storage medium of claim 1, wherein performing the semantic analysis includes:

analyzing the source code for markers including at least one of a user identifier or a context parameter.

7. The non-transitory, computer-readable storage medium of claim 1, wherein the authorization function comprises a single-user privilege verification function or a multi-privilege verification function.

8. A system comprising:

at least one hardware processor; and at least one non-transitory memory storing instructions, which, when executed by the at least one hardware processor, cause the system to perform operations including:

receiving, from a source code repository or a build pipeline, source code including an implementation file and at least one service definition file, wherein the at least one service definition file includes metadata and a service interface definition;

determining that the source code implements an Application Programming Interface (API) handler by:

determining that the implementation file includes a reference to the service interface definition;

determining, based on the metadata, that the API handler is associated with a public endpoint;

determining, using a large language model, that the source code lacks an authorization check by:

performing pattern recognition on the source code to determine absence of a direct call to an authorization function; and performing semantic analysis on the source code to determine absence of an indirect authorization check; and responsive to determining that the API handler is associated with a public endpoint and that the source code lacks an authorization check, transmitting, to a computer system, an alert indicating that the source code implements an API handler associated with a public endpoint and that the source code lacks an authorization check.

9. The system of claim 8, wherein determining that the source code lacks an authorization check includes:

dispatching one or more agents to autonomously validate the source code to determine lack of an authorization check.

10. The system of claim 8, wherein determining absence of an indirect authorization check includes:

determining absence of session token verification within the source code.

11. The system of claim 8, wherein determining absence of an indirect authorization check includes:

determining absence of role verification within the source code.

12. The system of claim 8, wherein performing the semantic analysis includes:

analyzing gating conditions present in the source code.

13. The system of claim 8, wherein the metadata comprises at least one access modifier indicating that the API handler is publicly accessible.

14. The system of claim 8, wherein the at least one service definition file includes an interface definition language (IDL) file.

15. A method comprising:

receiving, from a source code repository or a build pipeline, source code including an implementation file and at least one service definition file, wherein the at least one service definition file includes metadata and a service interface definition;

determining that the source code implements an Application Programming Interface (API) handler by:

determining that the implementation file includes a reference to the service interface definition;

determining, based on the metadata, that the API handler is associated with a public endpoint;

determining, using a large language model, that the source code lacks an authorization check by:

performing pattern recognition on the source code to determine absence of a direct call to an authorization function; and performing semantic analysis on the source code to determine absence of an indirect authorization check; and responsive to determining that the API handler is associated with a public endpoint and that the source code lacks an authorization check, transmitting, to a computer system, an alert indicating that the source code implements an API handler associated with a public endpoint and that the source code lacks an authorization check.

16. The method of claim 15, wherein the source code comprises Go programming language code.

17. The method of claim 15, wherein determining that the implementation file includes a reference to the service interface definition includes:

analyzing a file path associated with the implementation file to determine that the implementation file is located in an API directory; and determining that the implementation file includes an import statement referencing the service interface definition.

18. The method of claim 15, wherein determining that the source code lacks an authorization check is performed using agentic validation of a codebase associated with the source code.

19. The method of claim 15, wherein the at least one service definition file includes a remote procedure call (RPC) framework definition file.

20. The method of claim 15, wherein determining that the source code implements an API handler is performed by analyzing annotations applied to a function within the implementation file.

* * * * *